(No Model.)
E. NORTON & J. G. HODGSON.
COMBINED SOLDER AND FLUX.
No. 400,869. Patented Apr. 2, 1889.
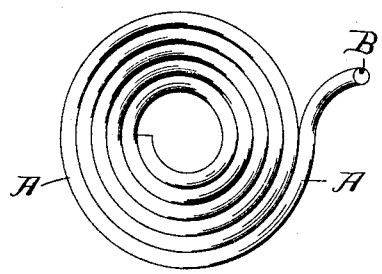
Fig. 1
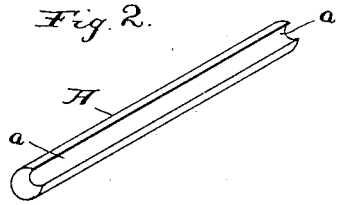
Fig. 2.
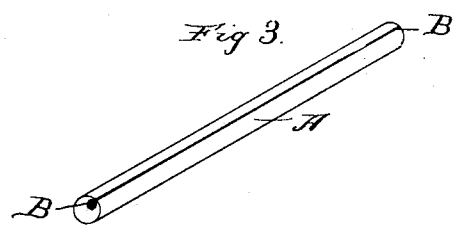
Fig. 3.
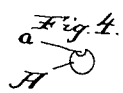 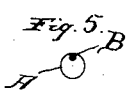   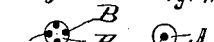 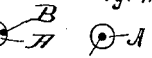
Fig. 4. Fig. 5. Fig. 6. Fig. 7. Fig. 8. Fig. 9.
Witnesses:
Lew. E. Curtis.
H. W. Munday
Inventors:
Edwin Norton.
John G. Hodgson.
By Munday Evarts & Adcock
their Attorneys

United States Patent Office.

EDWIN NORTON AND JOHN G. HODGSON, OF CHICAGO, ILLINOIS, ASSIGNORS TO SAID EDWIN NORTON AND OLIVER W. NORTON, OF SAME PLACE.

COMBINED SOLDER AND FLUX.

SPECIFICATION forming part of Letters Patent No. 400,869, dated April 2, 1889.

Application filed April 5, 1886. Serial No. 197,779. (No model.)

*To all whom it may concern:*

Be it known that we, EDWIN NORTON and JOHN G. HODGSON, citizens of the United States, residing in Chicago, in the county of Cook and State of Illinois, have invented a new and useful Combined Solder and Flux, of which the following is a specification.

Our invention relates to improvements in combined solder-wire and flux.

The object of the invention is to provide a combined solder-wire and flux of a simple and practical construction, which may be easily and cheaply manufactured, and wherein the flux, in a powdered or other form, may be securely applied to the solder-wire or inclosed by such wire, so that the flux will not be liable to be displaced from the wire.

To this end our invention consists in wire-solder furnished with its complement or required amount of flux contained in a closed or partially-closed groove or channel made in the body of the solder-wire on the outside thereof. The partially-closed groove may be originally made of a dovetail shape, leaving just a sufficient slit or opening to apply the flux; or the groove may be made with a wider mouth and closed entirely or partially after the flux is filled in.

B means of our combined solder-wire and flux the flux and solder may be simultaneously applied to the seam to be soldered without any danger of the flux being displaced or lost out at any portion of the wire, thus insuring perfect work.

The flux may consist of rosin, paraffine, stearine, borax, or any other suitable or known fluxing material. The flux may be applied in any suitable manner—as, for example, by passing the wire-solder furnished with a suitable groove on its periphery through a box or vessel containing the fluxing material either in a powder or liquid form. The groove or channel or other recess for receiving the flux may be conveniently formed in the wire-solder at the time of manufacture. Where the wire-solder is produced by forcing the solder out through a die—as by a hydraulic press— the die may be made of such form as to produce a suitable groove or channel in the wire. When the wire-solder is made by the common process of issuing a jet of molten solder into a bath of water, the wire may be grooved to receive the flux in any suitable manner—as, for example, by passing it between die-rollers or other dies. After the groove or channel is charged with the flux, powdered rosin being preferably used, the groove or channel is closed or partially closed by passing the wire through another die or pair of dies, so as to better retain the flux.

In the accompanying drawings, which form a part of this specification, and in which similar letters of reference indicate like parts, Figure 1 shows a small coil of combined wire-solder and flux embodying our invention. Fig. 2 shows a short piece of the wire solder as prepared ready to receive the flux. Fig. 3 shows the same after the channel or groove has been filled with the flux and partially closed. Figs. 4 and 5 are end views of Figs. 2 and 3. Figs. 6, 7, and 8 are end views showing different forms of grooves or channels for the reception of the flux.

In said drawings, A represents a piece of wire-solder, and B the fluxing material with which it is provided. The solder-wire A is furnished with a groove or channel, $a$, which is filled or partially filled with fluxing material, B, preferably rosin in a powdered state. The groove or channel $a$, after the flux is deposited therein, is closed or partially closed about the same, as shown in Fig. 3; or the channel may be originally made of a dovetail shape. The size of this channel will of course depend somewhat upon the size of the solder-wire and upon the particular kind of fluxing material employed. It should, however, be so proportioned that any given length or quantity will contain complementary or proper proportions of both solder and flux.

In Fig. 8 a number of smaller longitudinal channels or grooves are shown on the solder-wire.

In Fig. 9 the channel for the flux consists of a central hole or bore in the solder-wire.

This form of our combined prepared solder and flux may be formed by passing a thin flat strip of solder through a die, which curves or laps it into cylindrical form as it issues; or it may be made in much the same way as ordinary lead pipe is made—that is, by forcing it out of a hydraulic press through a suitable die. The flux need not be applied at the same time the channel is formed in the solder-wire, as the wire may be thus grooved, and the flux may then be applied to the solder in the machine or at the time the solder is used for soldering the seams. However, it is most convenient to apply the flux at the same time the channel for the same is formed. Where the flux-channel consists of a central bore, as shown in Fig. 9, the means of making and filling the same with flux will be readily understood by those skilled in the art. Where the hollow-bore wire is formed by curving or lapping a thin flat strip of solder into cylindrical form, as first above indicated, the flux may be applied at the same time the channel is formed by means similar, for example, to that shown and described in Patent No. 275,408, of April 10, 1883, for covering electric cables embedded in a rosin or insulating material with a lead or soft-metal tube. Where the hollow-bore solder-wire is made like lead pipe by forcing it out of a hydraulic press through a suitable die, as before mentioned, the flux may be applied at the time the channel or bore is formed by the well-known means employed for filling the lead covering-tubes of telegraph-cables with rosin or insulating material—such, for example, as is shown and described in Patents No. 233,970, of November 2, 1880, or No. 288,795, of November 20, 1883.

By our invention the solder and flux are applied simultaneously to the joint to be soldered, thus greatly saving time and labor where the operations are performed by hand, and greatly simplifying the construction and operation of the machines where it is done automatically or by machinery. It also furnishes a convenient method of applying rosin and other fluxes of a like character in soldering-machines wherein heretofore acid fluxes have been generally used.

By our invention the flux is made in the form of a filament, and is thus as conveniently applied to the seam as the solder itself when in a filamentary or wire form. The filament of flux being combined with the solder filament or wire, the fluxing and soldering operations, whether done by hand or by machinery, become one and the same.

In addition to the saving of time and labor, the combining of solder and its flux for simultaneous use has the following obvious advantages over a separate application, viz.: First, economy—less flux is required, as none is wasted; second, neatness—the surface of the tin is not disfigured by being smeared with superfluous flux, and, third, more satisfactory work may be done, as the flux is not evaporated or burned off by the heat before the solder is applied.

We claim—

1. Wire-solder provided with an outside groove or channel, a flux in said groove or channel, said groove or channel being closed or partially closed about said flux, substantially as specified.

2. Wire-solder provided with an outside dovetail-shaped groove or channel formed in the body of the wire for containing flux, substantially as specified.

3. Flexible solder-wire provided with a continuous longitudinal bore containing flux, whereby the flux is retained in place therein, substantially as specified.

EDWIN NORTON.
JOHN G. HODGSON.

Witnesses:
H. M. MUNDAY,
EDMUND ADCOCK.